Patented Oct. 22, 1929

1,732,770

UNITED STATES PATENT OFFICE

CLAYTON OLIN NORTH, OF AKRON, OHIO, ASSIGNOR TO THE RUBBER SERVICE LABORATORIES COMPANY, OF AKRON, OHIO, A CORPORATION OF OHIO

RUBBER VULCANIZATION ACCELERATOR

No Drawing.   Application filed September 21, 1926.  Serial No. 136,893.

The present invention is directed to the art of manufacturing vulcanized rubber by a process wherein there is employed as an accelerator of the vulcanization step, a compound obtained by reacting carbon bisulphid upon the aldehyde derivative of a Schiff's base. More particularly, the invention comprises the use as vulcanization accelerators of the carbon bisulphid reaction product of the aliphatic aldehyde derivative of those compounds resulting from the interaction of an aromatic primary amine with an aliphatic aldehyde, particularly where the amine and aldehyde have been preliminarily combined in other than equimolecular proportions of aldehyde to amine.

In United States Patent No. 1,467,984, granted to me September 11, 1923, I have disclosed and claimed as vulcanization accelerators, an aldehyde reaction product of a Schiff's base. According to this patent, such accelerators as a class comprise those products wherein two molecular proportions of an amine, such as aniline, have combined with three molecular proportions of an aldehyde, such as acetaldehyde. The present application discloses the use as vulcanization accelerators of the compounds resulting from the treatment of those accelerators claimed in the patent hereinbefore referred to, with carbon bisulphid. The carbon bisulphid, as is hereinafter disclosed, may be combined with the aldehyde derivative of a Schiff's base, in equimolecular or in other proportions and the resulting product employed as an accelerator.

Such a compound may be readily obtained by treating an aldehyde derivative of a Schiff's base, prepared according to the process set forth in the patent hereinbefore referred to, with an excess of carbon bisulphid. Thus, for example, one molecular proportion (264 parts) of the acetaldehyde derivative of the reaction product of two molecular proportions of aniline with two molecular proportions of acetaldehyde is refluxed gently with an excess of carbon bisulphid. The temperature of the mass is maintained for a period of several hours approximately at, but preferably not greatly above the boiling point of carbon bisulphid. Thus, for example, a desirable and effective temperature range may comprise from 45 to 55° C. or thereabout. During the refluxing action, hydrogen sulphid is evolved and the refluxing is continued until evolution of this gas has substantially ceased. Any uncombined carbon bisulphid is then removed by distillation from the mass and the resulting product, a brownish to black resinous mass, comprises one of my new class of accelerators. The product in this particular example, apparently comprises the combination of 1.5 molecules of carbon bisulphid with each molecule taken of the aldehyde derivative of a Schiff's base.

The reaction product so obtained has been found to mill into a rubber compound very readily and may be employed as a vulcanization accelerator as is evident from the following examples:

A rubber mix applicable for use as a cushion tire tread stock may comprise 55 parts of rubber, such as smoked sheet rubber, 30 parts of carbon black, 2 parts of sulfur, 1 part of hardwood pitch, 11.2 parts of zinc oxide and 0.75 parts of the carbon bisulphid reaction product of the compound resulting from the combination of two molecules of aniline with three molecules of acetaldehyde. The mix may then be satisfactorily vulcanized by heating for approximately one hour and thirty minutes in a press at the temperature given by 40 pounds of steam pressure per square inch.

The same accelerator employed in the example previously given may be used in the manufacture of a friction stock. Such a compound may, for example, comprise 100 parts of rubber, such as smoked sheet rubber, 4 parts of sulfur, 5 parts of zinc oxide and 0.4 parts of the accelerator. The compound may be vulcanized by heating for approximately thirty minutes in a press at the temperature given by 40 pounds of steam pressure.

A tire tread stock applicable in the manufacture of pneumatic tires may be prepared by combining in the well known manner, a mix comprising 31 parts of smoked sheet rubber, 21 parts of brown crepe rubber, 19 parts of carbon black, 20.5 parts of zinc oxide, 1.8 parts of sulfur, 7 parts of mineral rubber and 0.7 parts of the accelerator prepared as hereinbefore described. The rubber compound may then be vulcanized by heating in a press at the temperature given by 40 pounds of steam pressure per square inch for approximately one hour.

Another example of the applicability of the accelerators herein set forth is the following which comprises a so-called pure gum stock. Such a compound may comprise 100 parts of smoked sheet rubber, 4 parts of sulfur and 0.4 parts of the preferred type of accelerator. The compound is then vulcanized by heating for approximately one hour under the conditions hereinbefore described and upon testing is found to possess the high quality necessary for this type of a rubber compound.

Accelerators similar in their action in a rubber mix to the one described in the example given, may be prepared by reacting carbon bisulphid upon the reaction product of other aldehydes and amines than those hereinbefore set forth. Thus, for example, a reaction product of acrolein aniline was prepared and this product was refluxed with carbon bisulphid in the manner as hereinbefore described. The resulting product was hard and brittle and when added in relatively small proportions, for example, from 0.4 to 1 part to every 100 parts of rubber employed, and the rubber mix heated in the well known manner, produced a vulcanized rubber product comparable in characteristics to those previously described.

The reaction product of ortho-toluidine and acetaldehyde, wherein the amine and aldehyde are combined in other than equimolecular proportions, for example, in the proportion of 1 molecule of amine to 2.25 molecules of aldehyde, has been reacted with carbon bisulphid in the manner as described, and the resulting product employed as an accelerator.

The reaction of the various aldehyde-amine reaction products with carbon bisulphid in the production of accelerators of the type herein set forth, may be carried out in other ways than that particularly described. Thus, for example, an aldehyde-amine reaction product may be heated under pressure with an excess of carbon bisulphid or vapors of carbon bisulphid may be led through an aldehyde-amine reaction product maintained under temperature of from 100 to 160° C.

Another example of my new class of accelerators comprises the carbon bisulphid derivative of the compound formed by the combination of aniline with butyl-aldehyde. The reaction product of three molecular proportions of butyl-aldehyde with one molecular proportion of aniline, prepared by refluxing 216 parts of butyl-aldehyde with 93 parts of aniline for a period of time and separating water of condensation therefrom, is treated with an excess of carbon bisulphid. A reaction commences at once in which hydrogen sulphid is evolved and heat is liberated. To avoid loss of the carbon bisulphid, the reaction preferably is carried out in a still having a reflux condenser attached thereto. The refluxing action is allowed to continue until evolution of hydrogen sulphid has substantially ceased whereupon any uncombined carbon bisulphid is removed by distillation from the still and a dark reddish liquid results.

This liquid comprising the carbon bisulphid derivative of the reaction product of aniline with butyl-aldehyde is incorporated in the proportion of 0.5 parts into a mix comprising 100 parts of rubber, 5 parts of zinc oxide and 3.5 parts of sulfur. The rubber compound is then vulcanized by heating for approximately thirty minutes in a press at the temperature given by 40 pounds of steam pressure per square inch. The vulcanized product, upon testing, is found to possess a modulus of elasticity at 300% elongation of 216, at 500% elongation of 526, at 700% elongation of 2145, a tensile strength at break of 3780 pounds per square inch and an ultimate elongation of 820%.

A further example of a vulcanization accelerator of the type disclosed in the present application comprises the carbon bisulphid derivative of a reaction product of aniline and heptaldehyde. A mixture of 228 parts (2 molecular proportions) of heptaldehyde and 93 parts (1 molecular proportion) of aniline is refluxed for a period of five hours at from 155 to 180° C., or for a longer time at a lower temperature. The reaction product is cooled down, water of condensation is removed therefrom and an excess of carbon bisulphid is added to the material. The mass is refluxed as previously described until hydrogen sulphid is no longer evolved and the uncombined carbon bisulphid is removed from the dark reddish liquid reaction product.

This product is then compounded in the proportion of 0.5 parts into a mix comprising 100 parts of rubber, for example smoked sheet rubber, 5 parts of zinc oxide and 3.5 parts of sulfur and the rubber compound so obtained is vulcanized by heating for approximately fifteen minutes in a press at the temperature given by 40 pounds of steam pressure per square inch. The vulcanized product upon testing is found to possess a modulus of elasticity at 300% elongation of 279, at 500% elongation of 742, at 700% elongation of 3090, a tensile strength at break of 4185 pounds per square inch and an ultimate elongation of 750%.

Other accelerators may be readily manufactured by reacting carbon bisulphid upon the reaction product of aromatic primary amines, such as the toluidines, the xylidines and the like, with aldehydes preferably of the aliphatic series, such as formaldehyde, acetaldehyde, propion aldehyde, butyl aldehyde, hexoicaldehyde, heptaldehyde, aldol, acrolein, crotonaldehyde and the like. The use of such products as rubber vulcanization accelerators is apparent to those skilled in the art in view of the various examples hereinbefore given. The reaction product of an aldehyde with an amine which is combined as described with carbon bisulphid, may comprise the product formed by the reaction of one molecular proportion of an amine with two molecular proportions of an aldehyde, or of 2 mols. of the amine with 3 mols. of an aldehyde, or of 1 mol. of the amine with 3 mols. of an aldehyde, or broadly by combining 1 mol. of an aromatic primary amine with from ½ to 3 mols. of an aliphatic aldehyde.

My invention is to be understood as limited only by the following claims attached hereto as part of this specification, wherein I intend to claim all novelty inherent in the invention as is permissible in view of the prior art.

What I claim is:—

1. The process of manufacturing vulcanized rubber which comprises heating a mixture of rubber and sulfur in the presence of a compound obtained by reacting carbon bisulfid upon an aldehyde derivative of a Schiff's base.

2. The process of manufacturing vulcanized rubber which comprises heating a mixture of rubber and sulfur in the presence of a compound obtained by reacting carbon bisulfid upon an aldehyde derivative of a Schiff's base prepared from an aliphatic aldehyde and an aromatic primary amine.

3. The process of manufacturing vulcanized rubber which comprises heating a mixture of rubber and sulfur in the presence of a compound obtained by reacting carbon bisulfid upon an aldehyde derivative of a Schiff's base prepared from heptaldehyde and aniline.

4. The process of manufacturing vulcanized rubber which comprises heating a mixture of rubber and sulfur in the presence of a compound obtained by reacting carbon bisulfid upon the reaction product of two molecular proportions of heptaldehyde and one molecular proportion of aniline.

5. The process of manufacturing vulcanized rubber which comprises heating a mixture of rubber and sulfur in the presence of a compound obtained by reacting carbon bisulfid upon the reaction product of an aliphatic aldehyde and an aromatic primary amine, said aldehyde-amine product being obtained by combining at least one-half mol. of said aldehyde with one mol. of an amine.

6. The process of manufacturing vulcanized rubber which comprises heating a mixture of rubber and sulfur in the presence of a compound obtained by reacting carbon bisulfid upon the reaction product of from ½ to 3 molecular proportions of an aliphatic aldehyde upon 1 molecular proportion of an aromatic primary amine.

7. The vulcanized rubber product obtained by heating a mixture of rubber and sulfur in the presence of a compound obtained by reacting carbon bisulfid upon an aldehyde derivative of a Schiff's base.

8. The vulcanized rubber product obtained by heating a mixture of rubber and sulfur in the presence of a compound obtained by reacting carbon bisulfid upon an aldehyde derivative of a Schiff's base prepared from an aliphatic aldehyde and an aromatic primary amine.

9. The vulcanized rubber product obtained by heating a mixture of rubber and sulfur in the presence of a compound obtained by reacting carbon bisulfid upon an aldehyde derivative of a Schiff's base prepared from heptaldehyde and aniline.

10. The vulcanized rubber product obtained by heating a mixture of rubber and sulfur in the presence of a compound obtained by reacting carbon bisulfid upon the reaction product of two molecular proportions of heptaldehyde with three molecular proportions of aniline.

11. The vulcanized rubber product obtained by heating a mixture of rubber and sulfur in the presence of a compound obtained by reacting carbon bisulfid upon the reaction product of an aliphatic aldehyde and an aromatic primary amine, said aldehyde-amine product being obtained by combining at least one-half mol. of said aldehyde with one mol. of an amine.

12. The vulcanized rubber product obtained by heating a mixture of rubber and sulfur in the presence of a compound obtained by reacting carbon bisulfid upon the reaction product of from ½ to 3 molecular proportions of an aliphatic aldehyde with one molecular proportion of an aromatic primary amine.

In testimony whereof I affix my signature.

CLAYTON OLIN NORTH.